(12) United States Patent
Liang

(10) Patent No.: US 8,339,383 B2
(45) Date of Patent: Dec. 25, 2012

(54) STYLUS

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 350 days.

(21) Appl. No.: 12/869,880

(22) Filed: Aug. 27, 2010

(65) Prior Publication Data

US 2011/0234548 A1    Sep. 29, 2011

(30) Foreign Application Priority Data

Mar. 25, 2010  (CN) .......................... 2010 1 0132929

(51) Int. Cl.
  *G06F 3/033* (2006.01)

(52) U.S. Cl. ..................................... 345/179; 178/19.01

(58) Field of Classification Search .......... 345/156–184; 178/19.01–19.07, 18.01–18.11; 401/144–190; 708/107; 81/411, 483
See application file for complete search history.

(56) References Cited

U.S. PATENT DOCUMENTS

| 5,850,059 | A  | * | 12/1998 | Yoshimura | 178/19.01 |
| 5,889,512 | A  | * | 3/1999  | Moller et al. | 345/179 |
| 7,431,528 | B2 | * | 10/2008 | Liu | 401/258 |
| 2003/0184529 | A1 | * | 10/2003 | Chien et al. | 345/179 |
| 2007/0024601 | A1 | * | 2/2007  | Liu et al. | 345/179 |
| 2009/0122029 | A1 | * | 5/2009  | Sin | 345/179 |

* cited by examiner

*Primary Examiner* — Kent Chang
*Assistant Examiner* — William Lu
(74) *Attorney, Agent, or Firm* — Altis Law Group, Inc.

(57) ABSTRACT

A stylus comprises a housing, a stylus body, a shell and a latching element. The housing has a receptacle and a sliding pin. The stylus body is accommodated in the housing, the stylus body has a track and engaging the sliding pin so the stylus body can slide relative to the housing, the stylus body further has a compartment. The shell is slidably accommodated in the compartment, the shell has a first stopping hole and a protrusion located adjacent to the first stopping hole, the first stopping hole is used for latching with the sliding pin to hold the stylus in a retracted state. The latching element is mounted in the receptacle and located near the stylus body, the latching element has a latching cantilever having a second stopping hole defined therethrough, the second stopping hole latches with the protrusion to hold the stylus in an extended state.

20 Claims, 5 Drawing Sheets

STYLUS

This application is related to co-pending U.S. patent application Ser. No. 12/840,450, entitled "STYLUS", by SHI-XU LIANG. This applications have the same assignee as the present application and have been concurrently filed herewith. The above-identified applications are incorporated herein by reference.

BACKGROUND

1. Technical Field

This exemplary disclosure generally relates to retractable/extendable styluses.

2. Description of Related Art

It is well-known that a variety of devices include a touch screen. Examples of such devices include smart phones, personal digital assistants (PDA), pagers, personal organizers, and the like. These devices typically include a display module under the touch screen. The display module generates target images associated with menu options, programs, user choices, and other operations. The user controls the device by pressing the touch screen over the target image with a stylus. However, typical styluses can be inconvenient to retract or extend.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
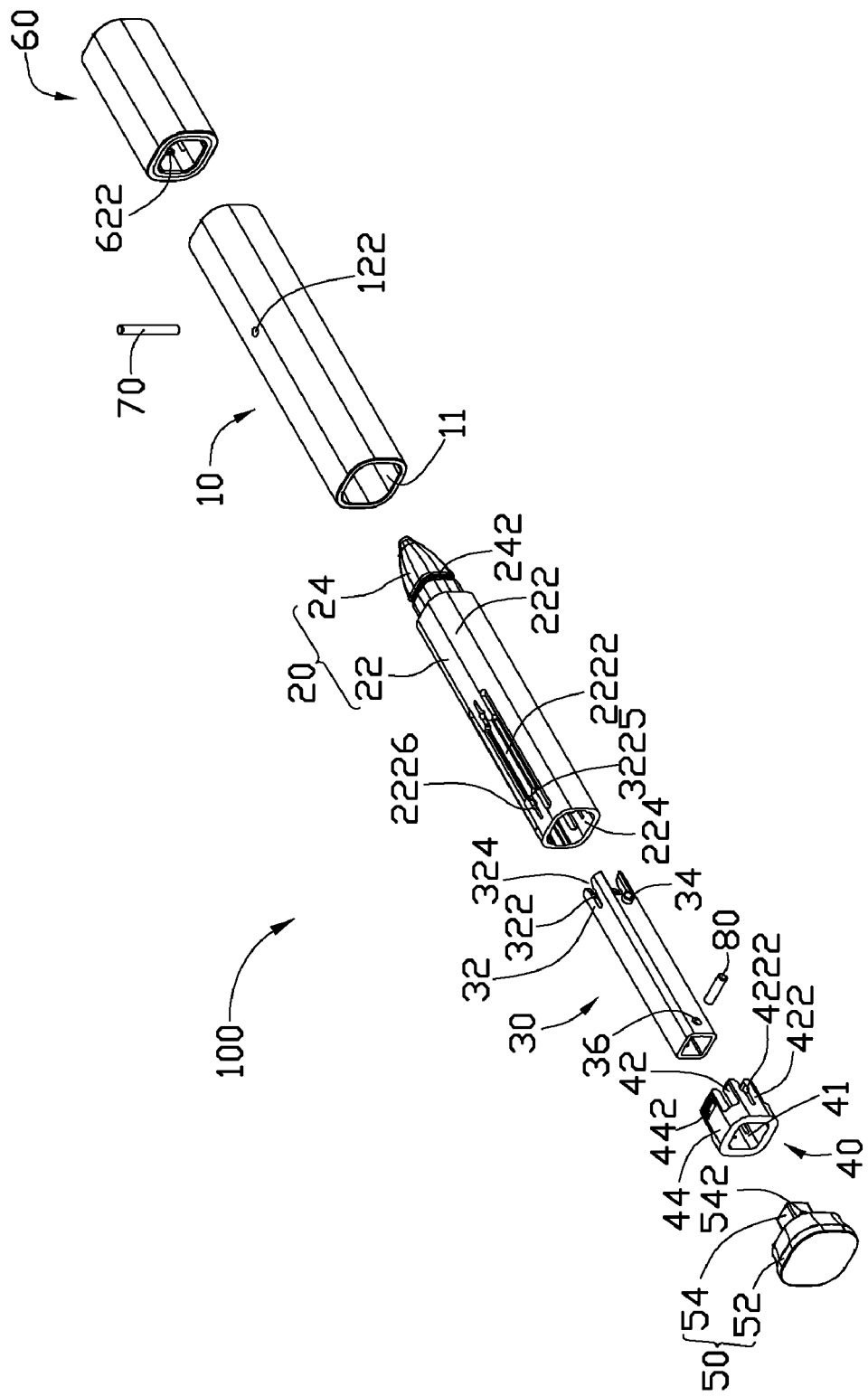
FIG. 1 is an exploded view of an exemplary stylus.
Figure 3:
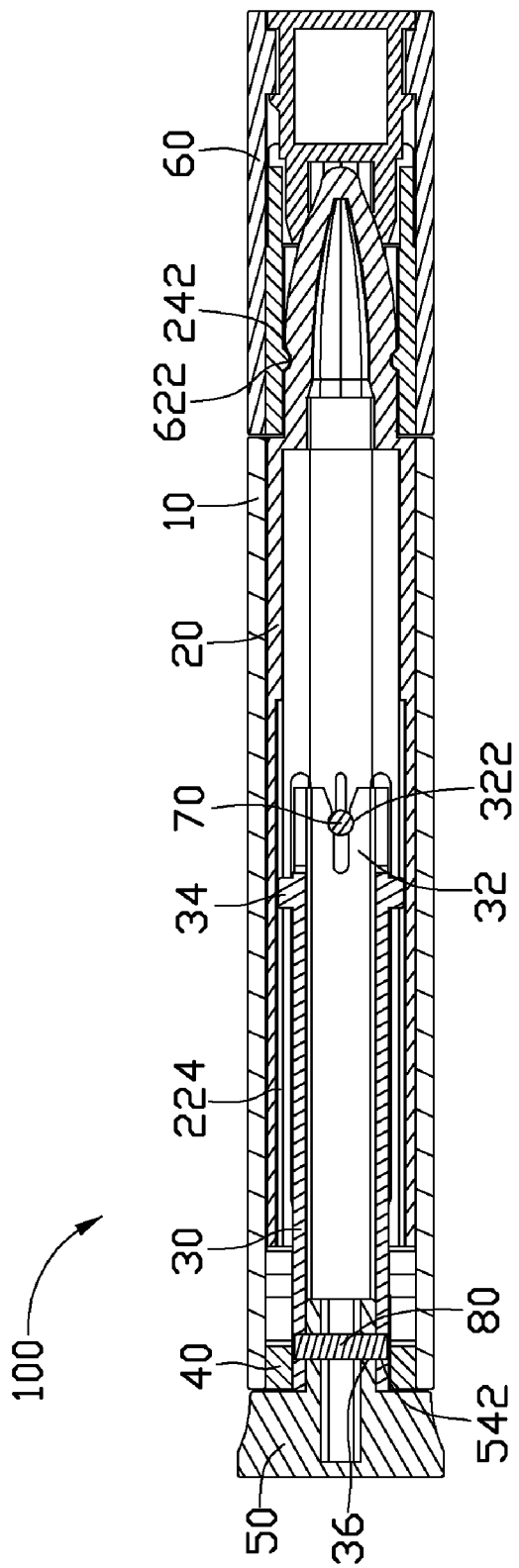
FIG. 3 is a cross-sectional view of the stylus shown in FIG. 2, and wherein the stylus is in a retracted state.

Referring to FIGS. 1 and 3, the stylus 100 includes a housing 10, a stylus body 20 slidably mounted to one end of the housing 10 by a slide enabling member, a shell 30 slidably mounted in the stylus body 20, a latching element 40 mounted to the other end of the housing 10, a cap 50 mounted to the shell 30 and a cover 60 for covering and protecting a distal end of the stylus body 20. The cap 50 is mounted to the shell 30 by a post 80.

The housing 10 is hollow, and longitudinally defines a receptacle 11 therethrough. The housing 10 further includes two aligned retaining holes 122 defined at one end thereof. The housing 10 may further includes a block 124 (see FIG. 4) protruding from an inner surface thereof for retaining the latching element 40 in the housing 10.

The stylus body 20 is slightly smaller than the receptacle 11 of the housing 10 so the stylus body 20 can be accommodated in the receptacle 11 and slide relative to the housing 10. In this exemplary embodiment, the cross section of the receptacle 11 is noncircular (e.g., rectangular), the stylus body 20 has a shape and profile which conforms with the receptacle 11 such that the stylus body 20 is non-rotatably mounted in the housing 10. The stylus body 20, in this exemplary embodiment, includes a hollow body 22 and a head 24 protruding from one end of the body 22. The body 22 longitudinally defines a compartment 224. The head 24 has a retaining slot 242 defined near the body 22. The retaining slot 242 is for holding the cover 60 on the stylus body 20. The cap 60 is hollow, having a protrusion 622 protruding from an inner surface thereof. The protrusion 622 corresponds with the retaining slot 246. The protrusion 622 rests in the retaining slot 246 when the cap 60 covers the head 24, firmly holding the cap 60 on the head 24 to protect the head 24.

Figure 4:
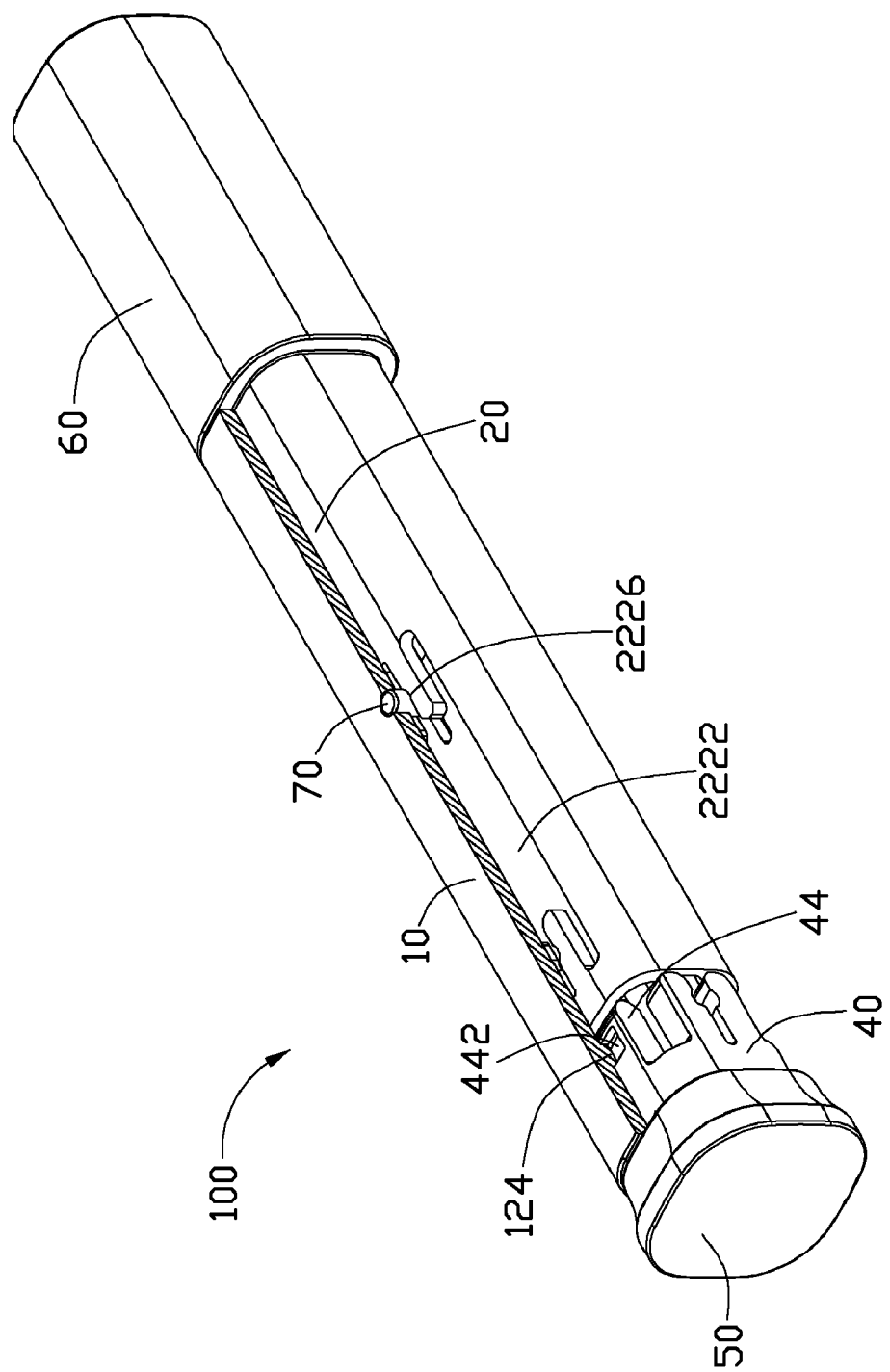
FIG. 4 is a cut-away view of the stylus in FIG. 2, and where the stylus is in a retracted state.

Referring to FIGS. 1 and 4, the slide enabling member allows the stylus body 20 to slidably engage the housing 10. The slide enabling member, in this exemplary embodiment, may include a sliding pin 70 and a track 2222 engaging the sliding pin 70. The sliding pin 70 is positioned in the retaining hole 122 of the housing 10 and the track 244 defined through the stylus body 20. The sliding pin 70 slides in the track 244 when the stylus body 20 slides relative to the housing 10. It is understood that one of ordinary skill in the art would appreciate the slide enabling member that comprises the sliding pin 70 and the track 244 only are one example. It is also understood that the sliding pin 70 may be carried on either the stylus body 20 or the housing and the sliding pin engaging member (e.g. track 2222) may be carried on the element that the sliding pin 70 are not carried on.

The slide enabling member further includes two limiting holes 2226 that are located respectively at opposites ends of the track 2222 and communicate with the track 2222. The limiting holes 2226 are configured to hold the stylus body 20 in a retracted state shown in FIG. 4 or an extended state shown in FIG. 5. Each limiting hole 2226 communicates with the track 2222 by a slit 2225. The limiting holes 2226 are sized and dimensioned to tightly fit the sliding pin 70 therein when the shell 20 is slid to the retracted state shown in FIG. 4 and/or the extended state shown in FIG. 5, and the slits 2225 are smaller than the sliding pin 70 so the sliding pin 70 can not freely slide out of the limiting holes 2226 when the sliding pin 70 is fit in the limiting holes 2226. Thus, the stylus body 20 can be firmly held in the retracted state and the extended state by the tight fit engagement between the limiting holes 2226 and the sliding pin 70.

The shell 30 is tubular and has generally the same shape as, but is slightly smaller than the compartment 224 so the shell 30 can be accommodated in the compartment 224 and slides relative to the stylus body 20. The shell 30 has one stopping mechanism formed at one end thereof. The stopping mechanism has two opposite arms 32 protruding from an end of the shell 30 and a protrusion 34 protruding an outer surface of the shell 30 adjacent to the arms 32. Each arm 32 has a first stopping hole 322 defined therethrough for latching with the sliding pin 70 so the shell 30 can be held in the retracted state such as shown in FIG. 3. Each arm 32 further includes a guiding groove 324 defined at a distal end thereof and communicating with the first stopping hole 322. The guiding grooves 324 are for guiding the sliding pin 70 to the first stopping holes 322. The first stopping holes 322 are sized and dimensioned to tightly fit the sliding pin 70 therein when the shell 30 is slid to the retracted state shown in FIG. 3, and the guiding grooves 324 are smaller than the sliding pin 70 such that the sliding pin 70 can not freely slide out of the first stopping holes 322 when the sliding pin 70 is fit in the first stopping holes 322. Thus, the shell 30 can be firmly held in the retracted state shown in FIG. 3 by the tight fit engagement between the first stopping holes 322 and the sliding pin 70. The protrusion 34 is for holding the shell 30 in the extended state shown in FIG. 5. The shell 30 further defines two retaining troughs 36 near another end thereof opposite to the arms 32. The retaining troughs 36 are for retaining the post 80 on the shell 30.

Figure 5:
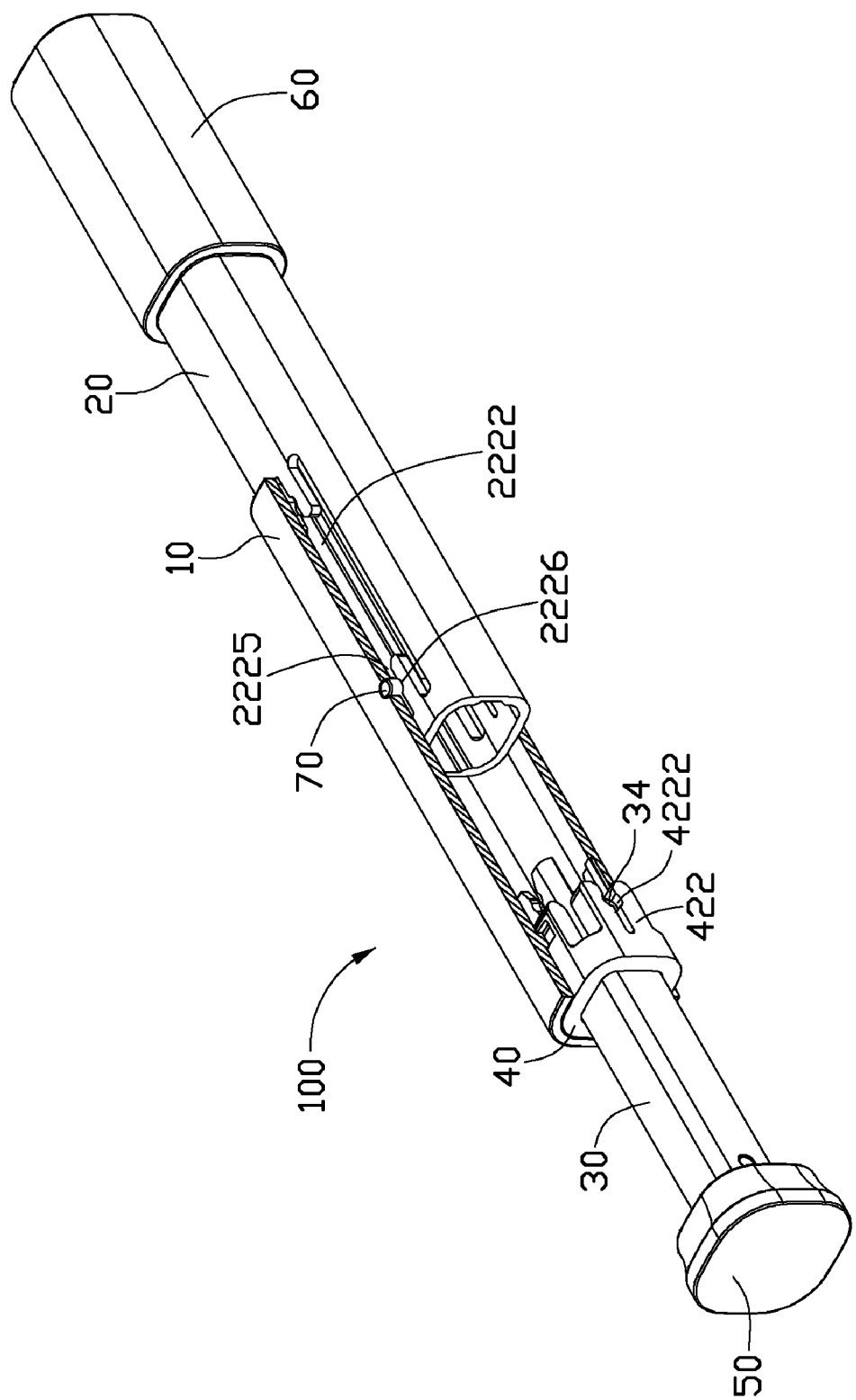
FIG. 5 is similar to FIG. 4, and where the stylus is in an extended state.

The latching element 40 is tubular, and longitudinally defines a chamber 41. The latching element 40 is tightly fitted around the shell 30 and can not rotate relative to the shell 30. In this exemplary embodiment, the cross section of the chamber 41 is noncircular (e.g., rectangular), the shell 30 has a shape and profile conforming to the chamber 41 so the shell 30 can not rotate in the chamber 41 relative to the latching element 40. The latching element 40 has a latching cantilever 42 and a retaining cantilever 44 protruding from one end thereof. The latching cantilever 42 has a second stopping hole 4222 defined therethrough for latching with the protrusion 34 so the shell 30 can be held in the extended state such as shown in FIG. 5. The second stopping hole 4222 is sized and dimensioned to tightly fit the protrusion 34 therein when the shell 30 is slid to the extended state shown in FIG. 5. Thus, the shell 30 can be firmly held in the extended state shown in FIG. 5 by the tight fit engagement between the second stopping hole 4222 and the protrusion 34. The retaining cantilever 44 has a retaining recess 442 recessed therein for latching with the block 124 to retain the latching element 40 to the housing 10.

The cap 50 includes a board 52 and a plunger 54 protruding from one side of the board 52. The plunger 54 is inserted in the shell 30 and defines an aperture 542 therethrough. When the plunger 54 is inserted in the shell 30, the aperture 542 is aligned with the retaining troughs 36, and the post 80 is tightly fitted in the aperture 542 and the retaining troughs 36 so the cap 50 is mounted to the shell 30.

Figure 2:
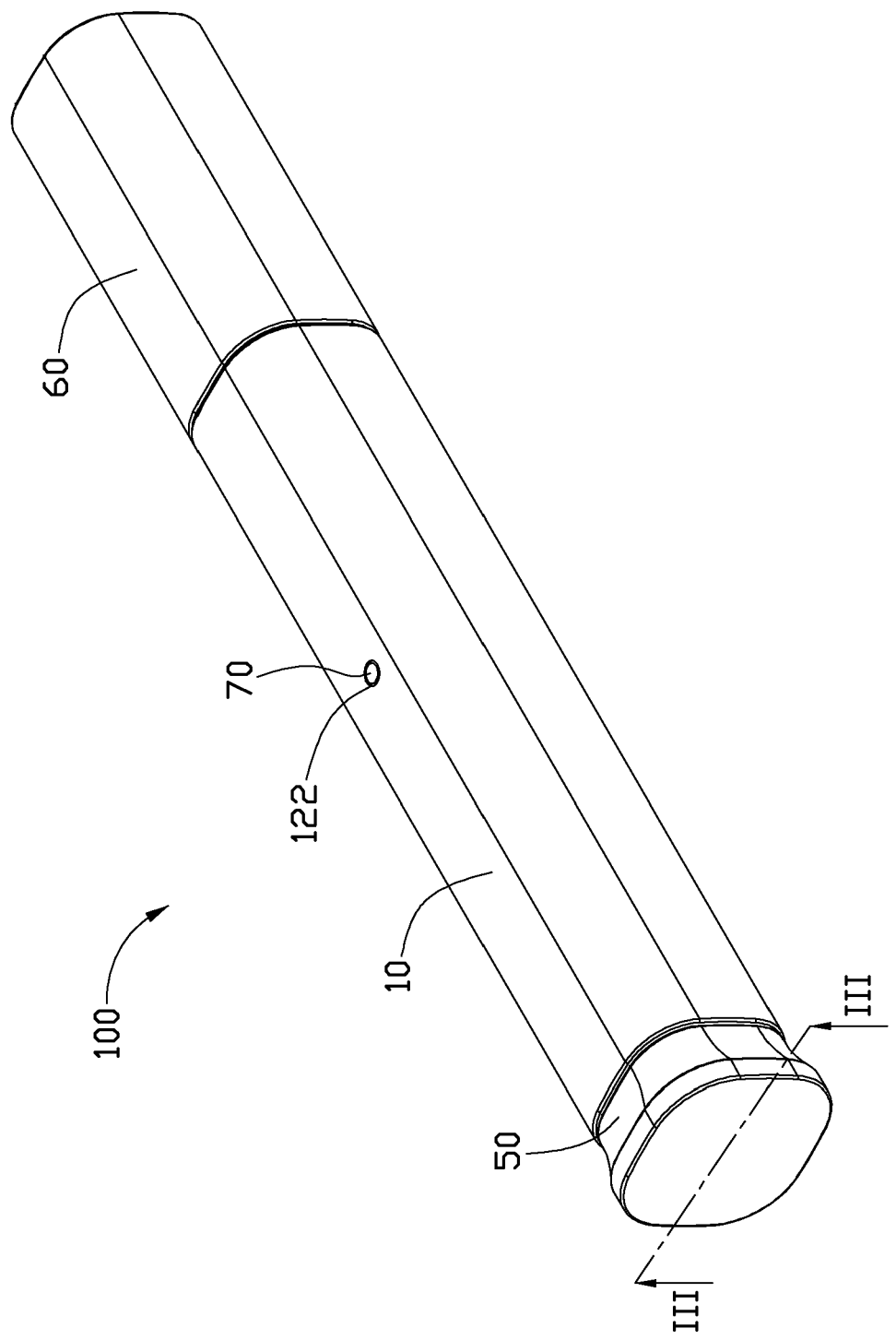
FIG. 2 is an assembled view of the stylus shown in FIG. 1.

Referring to FIG. 1-3, in assembly, the stylus body 20 is inserted in the receptacle 11 with one of the limiting holes 2226 located near the head 24 is aligned with the retaining holes 122. The sliding pin 70 is inserted in one of the limiting holes 2226 and the retaining holes 122 to latch the stylus body 20 to the housing 10. The shell 30 is inserted in the compartment 224 until the first stopping holes 322 is latched with the sliding pin 70. The latching element 40 is inserted in the receptacle 11 until the retaining recess 442 latch with the block 124, so the latching element 40 is mounted to the housing 10, and the shell 30 passes through the chamber 41 of the latching element 40. The plunger 54 of the cap 50 passes through the chamber 41 and then enters into the shell 30, until the aperture 542 aligns with the retaining troughs 36. The post 80 is inserted in the retaining troughs 36 and the aperture 542 to latch the cap 50 to shell 30. Finally the cover 60 is positioned on the stylus body 20 to complete assembly of the stylus 100.

Referring to FIGS. 3-5, in operation, the cap 50 is pulled away from the housing 10. Thus, the sliding pin 70 slides out from said one of the limiting hole 2226 to the track 2222, and then to the another one limiting hole 2226; the sliding pin 70 is then slides out of the first stopping hole 322 until the protrusion 34 latches with the second stopping hole 4222 such as shown in FIG. 5. Thereby, the stylus 100 is located in the extended state and is ready to use.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
a housing defining a receptacle and having a sliding pin retained thereon;
a stylus body accommodated in the housing, the stylus body defining a longitudinal track engaging the sliding pin so the stylus body can slide relative to the housing along the sliding pin, the stylus body further defining a compartment;
a shell slidably accommodated in the compartment, the shell defining a first stopping hole defined at one end thereof and a protrusion located adjacent to the first stopping hole, the first stopping hole used for latching with the sliding pin to hold the stylus in a retracted state;
a latching element mounted in the receptacle and located near the stylus body, the latching element having a latching cantilever defining a second stopping hole, the second stopping hole being used for latching with the protrusion to hold the stylus in an extended state.

2. The stylus as claimed in claim 1, wherein the latching cantilever protrudes toward the stylus body.

3. The stylus as claimed in claim 1, wherein the housing has a block protruding from an inner surface thereof, the latching element having a retaining cantilever protruding toward the stylus body, the retaining cantilever having a retaining recess recessed therein for latching with the block to latch the latching element to the housing.

4. The stylus as claimed in claim 1, wherein the stylus further includes a cap including a board and a plunger extending from the board; the plunger is mounted to the shell.

5. The stylus as claimed in claim 1, wherein the housing further includes two aligned retaining holes defined at one end thereof; the stylus body having a hollow body having an opening transversely defined therethrough, the opening is aligned with the retaining holes; the sliding pin is inserted in the opening and the retaining holes to latch the stylus body to the housing.

6. The stylus as claimed in claim 1, wherein the cross section of the receptacle is noncircular, the stylus body having a shape and profile conforming to the receptacle so the stylus body can not rotate in the receptacle relative to the housing.

7. The stylus as claimed in claim 1, wherein the shell has an arm protruding from one end thereof, the first stopping hole is defined through the arm.

8. The stylus as claimed in claim 7, wherein the arm further includes a guiding groove defined in a distal end thereof and communicating with the first stopping hole, the guiding groove is for guiding the sliding pin to the first stopping holes.

9. The stylus as claimed in claim 8, wherein the first stopping hole is sized and dimensioned to tightly fit the sliding pin therein when the shell is slid to the retracted state.

10. The stylus as claimed in claim 9, wherein the guiding grooves is smaller than the sliding pin such that the sliding pin can not freely slide out of the first stopping holes when the sliding pin is fit in the first stopping hole.

11. The stylus as claimed in claim 1, wherein the latching element is tubular, and longitudinally defines a chamber, the shell passes through the chamber; the cross section of the chamber is noncircular, and the shell having a shape and profile conforming to the chamber so the shell can not rotate in the chamber relative to the latching element.

12. A stylus, comprising:
- a housing having a receptacle defined therethrough and a sliding pin retained thereon;
- a stylus body accommodated in the housing, the stylus body defining a longitudinal track and engaging the sliding pin so the stylus body can slide relative to the housing along the sliding pin, the stylus body further having a compartment defined therethrough;
- a latching element securely received in the receptacle and spaced apart from the housing,
- a shell slidably accommodated in the receptacle, the shell having a stopping mechanism for selectively latching with one of the sliding pin and the latching element to hold the stylus in a retracted state or in an extend state.

13. The stylus as claimed in claim 12, wherein the stopping mechanism includes two arms extending from one end of the shell, each arm having a first stopping hole defined therein and used for latching with the sliding pin to hold the stylus in the retracted state.

14. The stylus as claimed in claim 13, wherein the arm further includes a guiding groove defined a distal end thereof and communicating with the first stopping hole, the guiding groove is for guiding the sliding pin to the first stopping holes.

15. The stylus as claimed in claim 14, wherein the first stopping hole is sized and dimensioned to tightly fit the sliding pin therein when the shell is slid to the retracted state.

16. The stylus as claimed in claim 15, wherein the guiding grooves is smaller than the sliding pin such that the sliding pin can not freely slide out of the first stopping holes when the sliding pin is fit in the first stopping hole.

17. The stylus as claimed in claim 12, wherein the stopping mechanism includes at least one protrusion protruding from outer surface of the shell, the latching element having a second stopping hole defined therein and used for latching with the protrusion to hold the stylus in the extend state.

18. The stylus as claimed in claim 17, wherein the latching element includes a latching cantilever protruding toward the stylus body, the second stopping hole is defined in the latching cantilever.

19. The stylus as claimed in claim 12, wherein the housing has a block protruding from an inner surface thereof, the latching element having a retaining cantilever protruding toward the stylus body, the retaining cantilever having a retaining recess recessed therein for latching with the block to latch the latching element to the housing.

20. The stylus as claimed in claim 12, wherein the stylus further includes a cap including a board and a plunger extending from the board; the plunger is mounted to the shell.

* * * * *